(12) United States Patent
Mikhailov et al.

(10) Patent No.: US 8,724,223 B2
(45) Date of Patent: May 13, 2014

(54) DEVICE FOR HOMOGENIZING LASER RADIATION

(75) Inventors: Aleksei Mikhailov, Dortmund (DE); Yury Kolotushkin, St. Petersburg (RU)

(73) Assignee: LIMO Patentverwaltung GmbH & Co. KG, Dortmund (DE)

( * ) Notice: Subject to any disclaimer, the term of this patent is extended or adjusted under 35 U.S.C. 154(b) by 90 days.

(21) Appl. No.: 13/202,220

(22) PCT Filed: Feb. 17, 2010

(86) PCT No.: PCT/EP2010/000993
§ 371 (c)(1),
(2), (4) Date: Aug. 18, 2011

(87) PCT Pub. No.: WO2010/094468
PCT Pub. Date: Aug. 26, 2010

(65) Prior Publication Data
US 2011/0299172 A1    Dec. 8, 2011

(30) Foreign Application Priority Data
Feb. 18, 2009    (DE) .......................... 10 2009 009 366

(51) Int. Cl.
*G02B 27/10*    (2006.01)
(52) U.S. Cl.
USPC ........................................ 359/626; 359/618
(58) Field of Classification Search
USPC ......... 359/618, 619, 621, 622, 623, 625–627, 359/850–851
See application file for complete search history.

(56) References Cited

U.S. PATENT DOCUMENTS

| 4,475,027 A | 10/1984 | Pressley |
| 5,993,010 A * | 11/1999 | Ohzawa et al. ................. 353/99 |
| 6,250,778 B1 * | 6/2001 | Doumuki ...................... 362/327 |
| 7,085,062 B2 | 8/2006 | Hauschild |
| 7,839,573 B2 | 11/2010 | Wippermann et al. |
| 2007/0054479 A1 | 3/2007 | Tanaka |
| 2007/0146853 A1 | 6/2007 | Singer et al. |
| 2009/0168072 A1 | 7/2009 | Visser et al. |

FOREIGN PATENT DOCUMENTS

| DE | 101 48 167 A1 | 4/2003 |
| DE | 10 2006 047 941 A1 | 4/2008 |
| EP | 1 489 438 A1 | 12/2004 |
| EP | 1 793 278 A2 | 6/2007 |
| WO | 01/35451 A1 | 5/2001 |
| WO | 2005/019900 A1 | 3/2005 |

* cited by examiner

*Primary Examiner* — Alicia M Harrington
(74) *Attorney, Agent, or Firm* — Laurence A. Greenberg; Werner H. Stemer; Ralph E. Locher

(57) ABSTRACT

A device for homogenizing laser radiation contains a plurality of mirror elements which are arranged offset with respect to one another and at which the laser radiation to be homogenized can be reflected in such a way that it is split into a plurality of partial beams corresponding to the number of mirror elements. The partial beams have a path difference with respect to one another as a result of the reflection. The device further has a plurality of lens elements, each of which is respectively assigned to one of the mirror elements in such a way that a respective one of the partial beams can pass through one of the lens elements. A distance between each of the mirror elements and the lens elements assigned thereto is equal to the focal length of the respective lens element.

15 Claims, 1 Drawing Sheet

DEVICE FOR HOMOGENIZING LASER RADIATION

BACKGROUND OF THE INVENTION

Field of the Invention

The present invention relates to a device according to the preamble of claim 1 for homogenizing laser radiation.

Definitions: in the propagation direction of the light to be influenced means the average propagation direction of the light, particularly when it is not a plane wave or is at least partially convergent or divergent. Light beam, sub-beam or beam, unless expressly indicated otherwise, does not mean an idealized ray of geometrical optics but a real light beam, for example a light beam with a Gaussian profile, which has an extended rather than infinitesimally small beam cross section.

A device for homogenizing laser radiation is known from European Patent Application EP 1 489 438 A1. The device described therein comprises two homogenizer stages, which are arranged successively in the propagation direction of the radiation. Each of these stages comprises a substrate with a cylinder lens array on the entry surface and a cylinder lens array crossed therewith on the exit surface. Owing to the two-stage embodiment, the laser radiation can be homogenized both in respect of its spatial distribution and in respect of its angular distribution. By the use of crossed cylinder lenses, this can be done with respect to two independent directions, for example, in the case of a laser diode bar as the laser beam source, with respect to the so-called fast axis and the so-called slow axis. The distance of the stages from one another corresponds essentially to the focal length of the second lens array.

A disadvantage found with such a device is the fact that the superposition of the individual sub-beams in the working plane can lead to interference effects, which may cause undesired structuring of the intensity distribution in the working plane.

A device of the type mentioned in the introduction is known from the German Patent Application DE 101 48 167 A1. In the device described therein, the light to be homogenized is reflected before striking a lens array by a stepped mirror, which is arranged at an angle in the device such that the sub-beams leaving the stepped mirror have a path difference. If this path difference is greater than the coherence length of the laser, the perturbing interference effects can thereby be avoided.

A disadvantage found with this device is that merely one lens array is provided for the homogenization, so that the laser light can be homogenized only with respect to its spatial distribution, but not with respect to its angular distribution. The effect of this is that divergent laser radiation cannot be homogenized with this device. If a second lens array were to be used in the device according to DE 101 48 167 A1, this would provide a device with which divergent laser radiation could also be homogenized. Such a device, however, would have a comparatively complex structure and would exhibit sizable losses owing to the large number of refractive and reflective surfaces.

BRIEF SUMMARY OF THE INVENTION

It is the object of the present invention to provide a device of the type mentioned in the introduction, which can lead to a more homogeneous intensity distribution with a simple design of the device.

This is achieved according to the invention by a device for homogenizing laser radiation. The device contains a multiplicity of mirror elements disposed offset with respect to one another and on which the laser radiation to be homogenized can be reflected so that the laser radiation is divided into a multiplicity of sub-beams, corresponding to a number of the mirror elements, and each have a path difference with respect to one another as a result of a reflection. The device further has a multiplicity of lens elements. One of the lens elements in each case is assigned to one of the mirror elements so that one of the sub-beams can respectively pass through one of the lens elements, and that a distance between each of the mirror elements and the lens elements assigned thereto is equal to a focal length of the lens element in question.

According to the invention, the distance between each of the mirror elements and the lens elements assigned thereto is equal to the focal length of the lens element in question. In this way, the mirror elements can fulfill the function of the first lens array of the two-stage homogenizer known from the prior art according to EP 1 489 438 A1. The device according to the invention can therefore also homogenize divergent laser radiation. Despite improving the homogenization by the path differences caused by the mirror elements, the device according to the invention requires comparatively few components.

In particular, each of the mirror elements acts as an entry pupil for the lens element assigned to this mirror element, the entry pupil having sharp edges.

The mirror elements are for example part of a stepped mirror, while the lens elements are for example part of a monobloc lens array. In addition, the device may comprise a lens which acts as a Fourier lens that can superpose the sub-beams passing through the lens elements with one another.

The mirror elements lie in the front focal plane of the lens elements. The purpose of the mirror elements is to provide a sharp-edged entry pupil for the lens elements. Since each point in the front focal plane of the lens elements is responsible for a particular angle of the laser light emerging from the lens elements, the sharp-edged field distribution in the front focal plane is converted into a likewise sharp-edged angular distribution behind the lens elements. The subsequent Fourier lens produces a homogeneous intensity distribution that has sharp edges in its rear focal plane, which may also act as the working plane of the overall device. In this way, a homogeneous distribution can be produced in a working plane by the device according to the invention, even if the laser radiation is divergent before entering the device. This distinguishes the two-stage arrangement according to the invention, consisting of a stepped mirror and lens array, from a one-stage version which comprises a lens array and a Fourier lens, or a stepped mirror arranged in front of the lens array at a distance not corresponding to the focal length thereof, a lens array and a Fourier lens. With the aid of a one-stage arrangement, it is in principle impossible to obtain a homogeneous distribution with sharp edges if the laser radiation to be homogenized is divergent.

Other features and advantages of the present invention will become clear from the following description of preferred exemplary embodiments with reference to the appended drawings, in which:

DESCRIPTION OF THE INVENTION

In the figures, parts or objects which are the same or functionally the same are provided with the same references.

Figure 1:
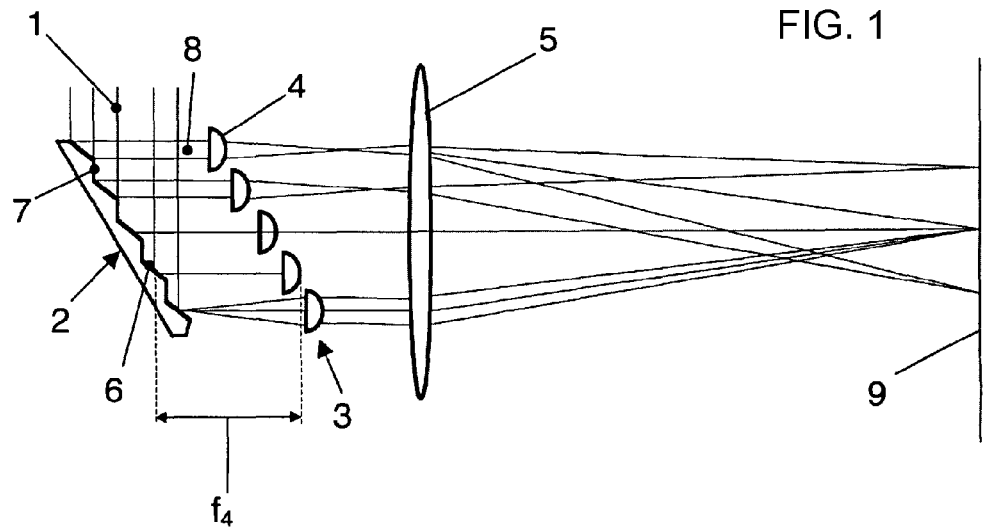
FIG. 1 shows a schematic side view of a first embodiment of a device according to the invention.

The embodiment according to FIG. 1 comprises, successively in the propagation direction of the laser radiation 1 to be homogenized, a stepped mirror 2, an array 3 of lens elements 4 and a lens 5 positioned in a Fourier arrangement The stepped mirror 2 comprises a multiplicity of reflective plane mirror elements 6, which are separated from one another by steps 7. By the mirror elements 6, the laser radiation 1 is divided into a number of sub-beams 8 corresponding to the number of mirror elements 6. In this case, the mirror elements 6 delimited laterally by the steps 7 act as sharp-edged entry pupils for the laser radiation 1.

This is in particular because the steps 7 make a different angle with the incident laser radiation 1, in the exemplary embodiment shown an angle of 0° or 180°. The steps cannot therefore deflect the laser radiation in the direction of the array 3.

The mirror elements 6 are respectively aligned at an angle of 45° to the incident laser radiation 1. Owing to the steps 7, they are offset with respect to one another so that the sub-beams 8 have an optical path difference with respect to one another. If the coherence length of the laser radiation 1 is less than the path difference of neighboring sub-beams 8, the interference effects after superposition by the lens 5 can be avoided.

Instead of the plane surfaces of the mirror elements 6, it is possible to provide concave surfaces. It is furthermore possible to produce the mirror elements by using a prism array, in which total internal reflections take place in the individual prisms.

In the exemplary embodiment shown, the lens elements 4 are cylinder lenses, the cylinder axes of which extend in the plane of the drawing. The optical axes of the lens elements 4 are aligned parallel to the propagation direction of the sub-beams 8.

Each of the sub-beams 8 strikes one of the lens elements 4, so that one of the lens elements 4 is assigned to each of the mirror elements 6. The lens elements 4 of the array 3 all have the same focal length $f_4$. The distance between the midpoint of a mirror element 6 and the lens element 4 assigned thereto is equal to the focal length $f_4$, so that each of the mirror elements 6 lies precisely in the front focal plane of the corresponding lens element 4.

Owing to the equal focal lengths $f_4$ of the lens elements 4, or the equal distances between the midpoints of the mirror elements 6 and the lens elements 4 assigned thereto, the direction in which the mirror elements 6 are arranged next to one another is parallel to the direction in which the lens elements 4 are arranged next to one another.

It is possible for the lens elements 4 to have different focal lengths from one another. In this case, it is necessary to ensure that the distance between each lens element and the mirror element assigned thereto is still equal to the focal length of the corresponding lens element. In this case, the distances between the individual lens elements and the mirror elements assigned thereto therefore differ from one another.

The lens 5 positioned in a Fourier arrangement superposes the sub-beams 8 emerging from the lens elements 4 in a working plane 9.

Figure 2:
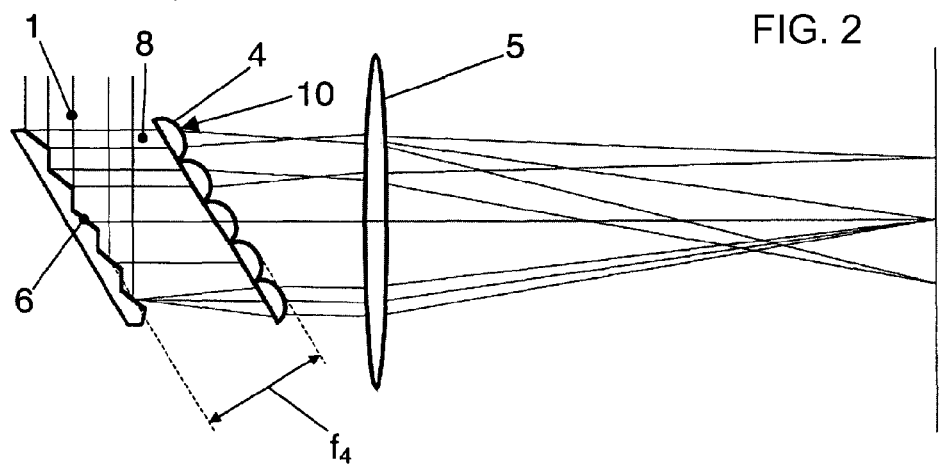
FIG. 2 shows a schematic side view of a second embodiment of a device according to the invention.

The embodiment according to FIG. 2 differs from that according to FIG. 1 in that the lens elements 4 are combined to form a monobloc lens array 10. The lens array 10 is arranged so that the optical axis of the lens elements 4 makes an angle not equal to 0 or 180° with the propagation direction of the sub-beams 8. In this arrangement as well, each of the mirror elements 6 lies precisely in the front focal plane of the lens element 4 assigned thereto.

The deficiency of such an arrangement is that the lens elements 4 of the lens array 10 must process the sub-beams 8 correctly even though they make relatively large angles with the optical axis of the lens elements 4. In the device according to FIG. 2, the stepped mirror 2 is arranged so that the incident laser radiation 1 and the reflected sub-beams 8 make an angle of 90° with one another. Such an arrangement is not indispensable.

Figure 3:
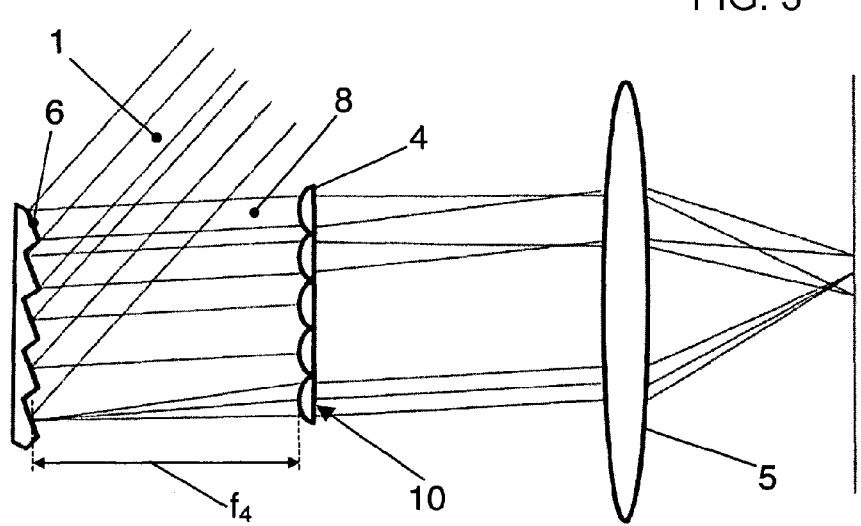
FIG. 3 shows a schematic side view of a third embodiment of a device according to the invention.

In the embodiment according to FIG. 3, the angle formed between the incident laser radiation 1 and the reflected sub-beams 8 is smaller. The sub-beams 8 therefore strike the lens array 10 perpendicularly, so that the optical axes of the lens elements 4 can be aligned parallel to the propagation direction of the sub-beams 8.

The invention claimed is:

1. A device for homogenizing laser radiation, the device comprising:

a multiplicity of mirror elements disposed offset with respect to one another and on which the laser radiation to be homogenized can be reflected so that the laser radiation is divided into a multiplicity of sub-beams, corresponding to a number of said mirror elements, and each sub-beam have a path difference with respect to one another as a result of a reflection; and a multiplicity of lens elements, one of said lens elements in each case assigned to one of said mirror elements so that one of the sub-beams can respectively pass through one of said lens elements, and that a distance between each of said mirror elements and said lens elements assigned thereto is equal to a focal length of said lens element in said multiplicity of lens element.

2. The device according to claim 1, wherein each of said mirror elements acts as an entry pupil for said lens element assigned to said mirror element.

3. The device according to claim 2, wherein said entry pupil has sharp edges.

4. The device according to claim 1, wherein said mirror elements are disposed next to one another in a first direction.

5. The device according to claim 1, wherein said mirror elements form a part of a stepped mirror.

6. The device according to claim 1, wherein said mirror elements are formed as separate mirrors.

7. The device according to claim 1, wherein all of said mirror elements have a same aperture.

8. The device according to claim 1, wherein at least one of said mirror elements is planar.

9. The device according to claim 4, wherein said lens elements are disposed next to one another in a second direction.

10. The device according to claim 9, wherein the first direction, in which said mirror elements are disposed next to one another, is parallel to the second direction in which said lens elements are disposed next to one another.

11. The device according to claim 1, wherein said lens elements form part of a monobloc lens array.

12. The device according to claim 1, wherein said lens elements are formed as an array of separate lens elements.

13. The device according to claim 1, wherein all of said lens elements have a same focal length.

14. The device according to claim 1, wherein all of said lens elements have a same aperture.

15. The device according to claim 1, further comprising a further lens functioning as a Fourier lens that can superpose the sub-beams passing through said lens elements.

* * * * *